United States Patent
Depraz et al.

(10) Patent No.: US 12,461,249 B2
(45) Date of Patent: Nov. 4, 2025

(54) GNSS SIGNAL MULTIPATH DETECTION DEVICE, AND ASSOCIATED CARRIER GEOLOCATION SYSTEM AND MULTIPATH DETECTION METHOD

(71) Applicant: THALES, Courbevoie (FR)

(72) Inventors: David Depraz, Valence (FR); Christian Mehlen, Valence (FR)

(73) Assignee: THALES, Courbevoie (FR)

( * ) Notice: Subject to any disclaimer, the term of this patent is extended or adjusted under 35 U.S.C. 154(b) by 289 days.

(21) Appl. No.: 18/263,263

(22) PCT Filed: Jan. 28, 2022

(86) PCT No.: PCT/EP2022/052011
§ 371 (c)(1),
(2) Date: Jul. 27, 2023

(87) PCT Pub. No.: WO2022/162127
PCT Pub. Date: Aug. 4, 2022

(65) Prior Publication Data
US 2024/0118429 A1 Apr. 11, 2024

(30) Foreign Application Priority Data
Jan. 29, 2021 (FR) ...................................... 21 00867

(51) Int. Cl.
*G01S 19/22* (2010.01)
*G01S 19/39* (2010.01)

(52) U.S. Cl.
CPC ............ *G01S 19/22* (2013.01); *G01S 19/396* (2019.08)

(58) Field of Classification Search
CPC .............................. G01S 19/22; G01S 19/396
See application file for complete search history.

(56) References Cited

U.S. PATENT DOCUMENTS

| 8,164,514 B1 | 4/2012 | Yang et al. |
| 2013/0335264 A1 | 12/2013 | Revol et al. |

(Continued)

FOREIGN PATENT DOCUMENTS

| NL | 2019768 A | * 4/2018 | ............ G01S 19/22 |
| WO | WO 2017/022391 | 2/2017 | |

OTHER PUBLICATIONS

International Search Report for PCT/EP2022/052011 dated May 11, 2022.
Preliminary Search Report for FR 2100867 dated Oct. 13, 2021.

*Primary Examiner* — Robert W Hodge
*Assistant Examiner* — Fred H Mull
(74) *Attorney, Agent, or Firm* — B. Aaron Schulman, Esq.; Stites & Harbison, PLLC

(57) ABSTRACT

A GNSS signal multipath detection device (16) for a GNSS receiver (12) on-board a carrier further comprising one or a plurality of antennas (14) and comprising:
 a movement generation module (22) configured for generating a movement of an apparent phase center according to a control law;
 a control module (23) configured for determining the control law;
 a prediction module (24) configured for determining a prediction of an observable value provided by the GNSS receiver (12), from the control law and directions of arrival of the GNSS signals;
 an anomaly detection module (25) configured for detecting multipaths by comparing an observable value coming from the GNSS receiver (12) with the corresponding prediction thereof.

11 Claims, 6 Drawing Sheets

(56) References Cited

U.S. PATENT DOCUMENTS

2015/0192656 A1* 7/2015 Werner .................... G01S 3/46
                                                                         342/442
2020/0132854 A1* 4/2020 Kubina ................... G01S 19/22

* cited by examiner

GNSS SIGNAL MULTIPATH DETECTION DEVICE, AND ASSOCIATED CARRIER GEOLOCATION SYSTEM AND MULTIPATH DETECTION METHOD

FIELD OF THE INVENTION

The present invention relates to a device for detecting GNSS signal multipaths.

The present invention further relates to a geolocation system and a detection method, associated with the detection device.

The field of the invention is the field of GNSS receivers.

More particularly, a GNSS receiver refers to a receiver used for receiving GNSS signals, i.e. signals coming from one or a plurality of Global Navigation Satellite Systems and, from such signals, for determining a navigation solution.

The field of application of the invention is the field of systems wherein it is sought to guarantee a full navigation solution determined by a "black box" GNSS receiver, i.e. GNSS receiver the features of which are not known a priori with regard to multipaths.

BACKGROUND OF THE INVENTION

Such is in particular the case for certain drone, rail or automotive applications, based on GNSS receivers the behavior of which with regard to multipaths is not subject to certification or commitment from the manufacturer and which operates in an environment which is a priori unfavorable. Such an unfavorable environment can be e.g. an urban environment, wherein satellites could be masked e.g. by buildings or other obstacles.

More generally, in the field of GNSS radio navigation, a "multipath" signal is a spurious signal which is due to the specular reflection of a satellite signal on the ground or on a nearby building and which is superimposed on or replaces the direct path.

The problem of multipaths is illustrated in particular in FIGS. 1 and 2 wherein a drone having the position P navigates in an urban environment. The GNSS receiver thereof uses signals from a satellite S for determining the position thereof.

In the example shown in FIG. 1, satellite S remains visible from the drone. The path M of the GNSS signals from the satellite S has a reflected path and the path D has a direct path. In principle, it is the direct path D which gives the correct measurement of distance to the satellite.

However, the combination of the two paths, namely the reflected path M and the direct path D, gives an apparent path M+D longer than the direct path D. The above then leads to an error in the estimated position P' which is different from the actual position P of the drone.

Such error in position is most often of a few meters but, in some cases, can exceed several tens of meters under unfavorable conditions.

In the example shown in FIG. 2, the satellite S is invisible from the drone. In such case, the signal transmitted via the reflected path M completely replaces the signal of the direct path D.

It is the worst case because the measurement is entirely produced by the reflected path M. In such case, the positioning error is the most severe and, in theory, is limited only by the environment.

In the prior art, many methods for detecting multipaths are already known.

Among such methods, there are methods, called external to the receiver, insofar as the detection or the mitigation of multipaths is carried out outside the GNSS receiver, and methods, called internal to the receiver, insofar as the detection or the mitigation of multipaths is carried out by the receiver as such.

Among the methods of the first type, a method is known in particular, consisting of choosing the antenna, the radiation pattern of which is optimized, so as to nominally receive the satellites above a given site, while strongly reducing the signal of the satellites below, more particularly for a negative site. However, such methods remain suitable only for the path coming from the ground or low on the horizon. Furthermore, the antenna with optimized radiation pattern used to implement such a method is generally bulky and heavy.

Among other methods of the first type, methods using an antenna array with a controlled radiation pattern are known. Such methods are used for controlling the directions of interest and in particular for maximizing the power ratio between the direct and the reflected signals or for detecting that a maximum power is received in an abnormal direction.

There is also a variant of such methods consisting of using a controlled polarization antenna array. Such latter methods are used for detecting multipaths by using the circular polarization inversion of the GNSS signal during specular reflection.

However, in both cases, the aforementioned methods involve a duplication of the processing channels. Furthermore, such methods require very stringent requirements for equalizing the transfer functions between the microwave channels. The above then implies the use of expensive and complex electronic systems which in practice require complex calibrations on the carrier.

Among the methods of the first type, methods using redundancies of information between a GNSS receiver and other means of location, are also known. However, in principle, such methods require the use of redundant means of location, which imposes many requirements, in particular in terms of volume, weight or cost.

There are also methods of the first type using a plurality of signal frequencies (and/or a plurality of codes) by satellites. Such methods use the fact that statistically it is unlikely that multipaths are identical over a plurality of frequencies or over a plurality of codes of the same satellite. However, the probability of undetected multipaths is lower than with a frequency and/or code but cannot be totally neglected for the most demanding applications in terms of integrity.

Finally, among the methods of the first type, there are also methods using the redundancies of measurements of a large number of satellites of one or a plurality of constellations. More particularly, such methods use the fact that erroneous measurements due to multipaths will appear inconsistent with all other measurements. However, such methods do not perform well in the case of an environment where the probability of a plurality of simultaneous multiple journeys cannot be excluded, which is generally the case in an urban environment.

Among the methods of the second type, methods using correlators and discriminants suitable for multipaths, are known.

Other methods of such type use the tracking of the GNSS signal phase.

Such methods use the fact that the influence of multipaths on the phase is, in principle, small.

Finally, further other methods of the second type propose generating a controlled movement of the apparent phase center of the antenna and, by using the controlled movement, to adapt the processing performed by the receiver.

However, all the methods of the second type require specific processing internal to the receptor. The above is not possible for "black box" receivers.

SUMMARY OF THE INVENTION

The goal of the present invention is to remedy all the drawbacks of the aforementioned methods.

More particularly, the goal of the present invention is to detect multipaths in a particularly efficient and simple way, and to do so without any intervention in the processing performed by the GNSS receiver.

To this end, the goal of the invention is a device for detecting multipaths of GNSS signals for a GNSS receiver on-board a carrier, the carrier further comprising one or a plurality of antennas defining an apparent phase center and at least one plane of arrival of the GNSS signals, the antenna or each antenna being apt to receive GNSS signals propagating along direct or indirect paths and to transmit same to the GNSS receiver, the GNSS receiver being apt to supply an observable value determined from the signals received by the antenna or each antenna.

The detection device comprises:
a movement generation module, configured for generating a movement of the apparent phase center according to a predetermined control law;
a control module configured for determining the control law;
a prediction module configured for determining, at each instant, a prediction of the observable value provided by the GNSS receiver at the same instant, from the control law and directions of arrival of the direct paths of the GNSS signals with respect to the or each plane of arrival;
an anomaly detection module configured for detecting multipaths of GNSS signals received by the GNSS receiver, by comparing the observable value from the GNSS receiver with the corresponding prediction thereof.

According to other advantageous aspects of the invention, the detection device comprises one or a plurality of the following features, taken individually or according to all technically possible combinations:
when the carrier comprises at least two antennas, the movement generation module is a switch apt to switch the transmission to the GNSS receiver of the signals received by the antennas, in order to generate an electrical movement of the apparent phase center according to the control law;
the movement generation module is apt to control at least one mechanical actuator of the carrier and/or of the or each antenna, so as to generate a mechanical movement of the apparent phase center according to the control law;
the directions of arrival of the direct paths of the GNSS signals with respect to the or each plane of arrival are determined from the absolute directions of arrival of the paths and values describing the attitude of the carrier;
values describing the attitude of the carrier include the heading, the roll and the pitch of the carrier;
the anomaly detection module is configured for analyzing a residue obtained after subtracting the prediction obtained by the prediction module from the corresponding observable value, so as to detect multipaths of GNSS signals;
the anomaly detection module is configured for comparing said residue with the control law;
the observable value is a measurement of phase or of pseudo-velocity of a given satellite or a measurement of the resolved velocity of the carrier.

A further subject matter of the invention is a geolocation system for a carrier comprising a GNSS receiver apt to supply an observable value; one or a plurality of antennas defining an apparent phase center and at least one plane of arrival, the antenna or each antenna being apt to receive GNSS signals propagating along either direct or indirect paths and to transmit same to the receiver (12), so as to supply the observable value and a device for detecting GNSS signal multipaths, as described hereinabove.

A further subject matter of the invention is a method for detecting multipaths of GNSS signals for a GNSS receiver on-board a carrier, the carrier further comprising one or a plurality of antennas defining an apparent phase center and at least one plane of arrival, the antenna or each antenna being apt to receive GNSS signals propagating along either direct or indirect paths and of transmitting same to the receiver, the GNSS receiver being apt to supply an observable value determined from the signals received by the antenna or each antenna.

The detection method comprising the following steps:
determination of a control law;
setting in motion the apparent phase center according to the control law;
determination, at each instant, of a prediction of the observable value provided by the GNSS receiver at the same instant, from the control law and directions of arrival of the direct paths of the GNSS signals with respect to the or each plane of arrival;
detection of multipaths of GNSS signals received by the GNSS receiver, by comparison of the observable value coming from the GNSS receiver with the corresponding prediction.

DESCRIPTION OF THE DRAWINGS

The features and advantages of the invention will appear upon reading the following description, given as an example, but not limited to, and making reference to the enclosed drawings, wherein.

DETAILED DESCRIPTION OF THE INVENTION

Figure 1:
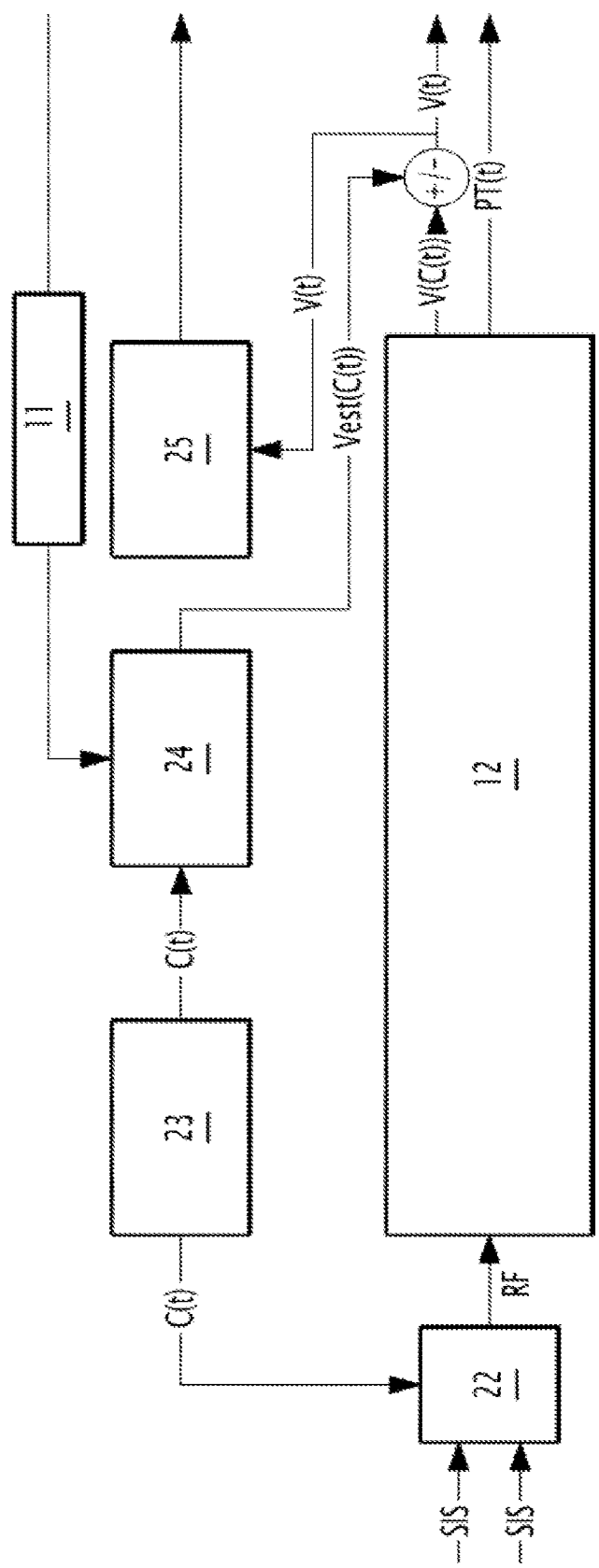
FIGS. 1 and 2 are schematic views explaining the multipath problem during a geolocation of a carrier in an urban environment.
Figure 2:
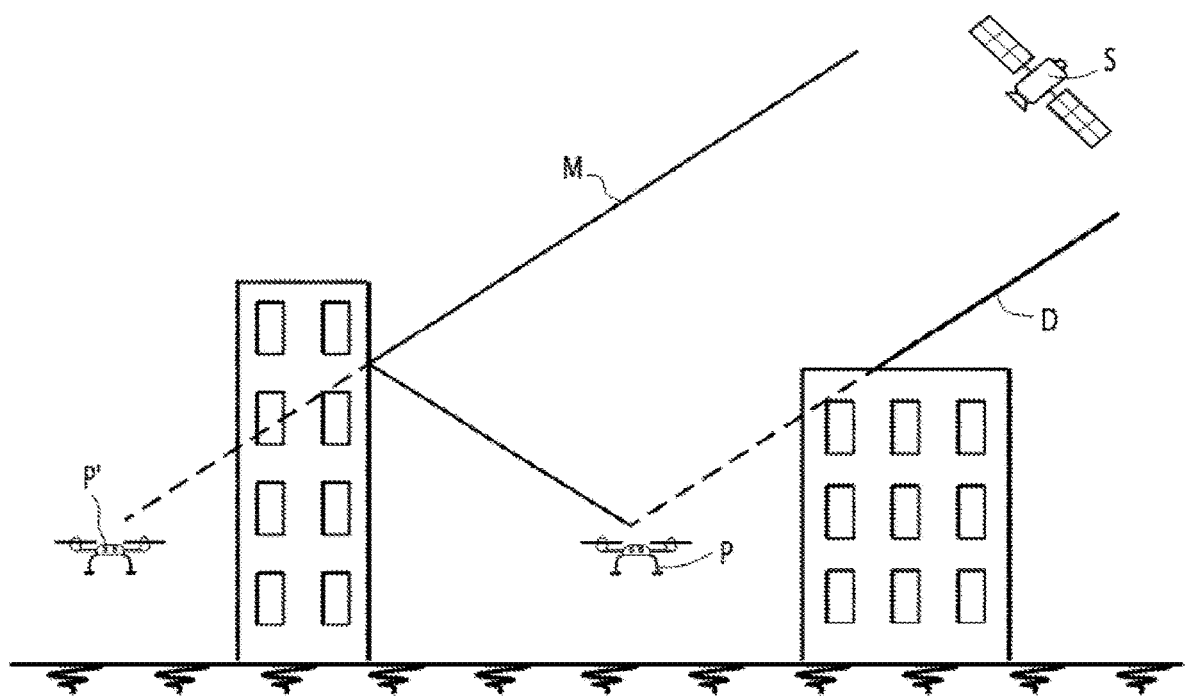
Figure 3:
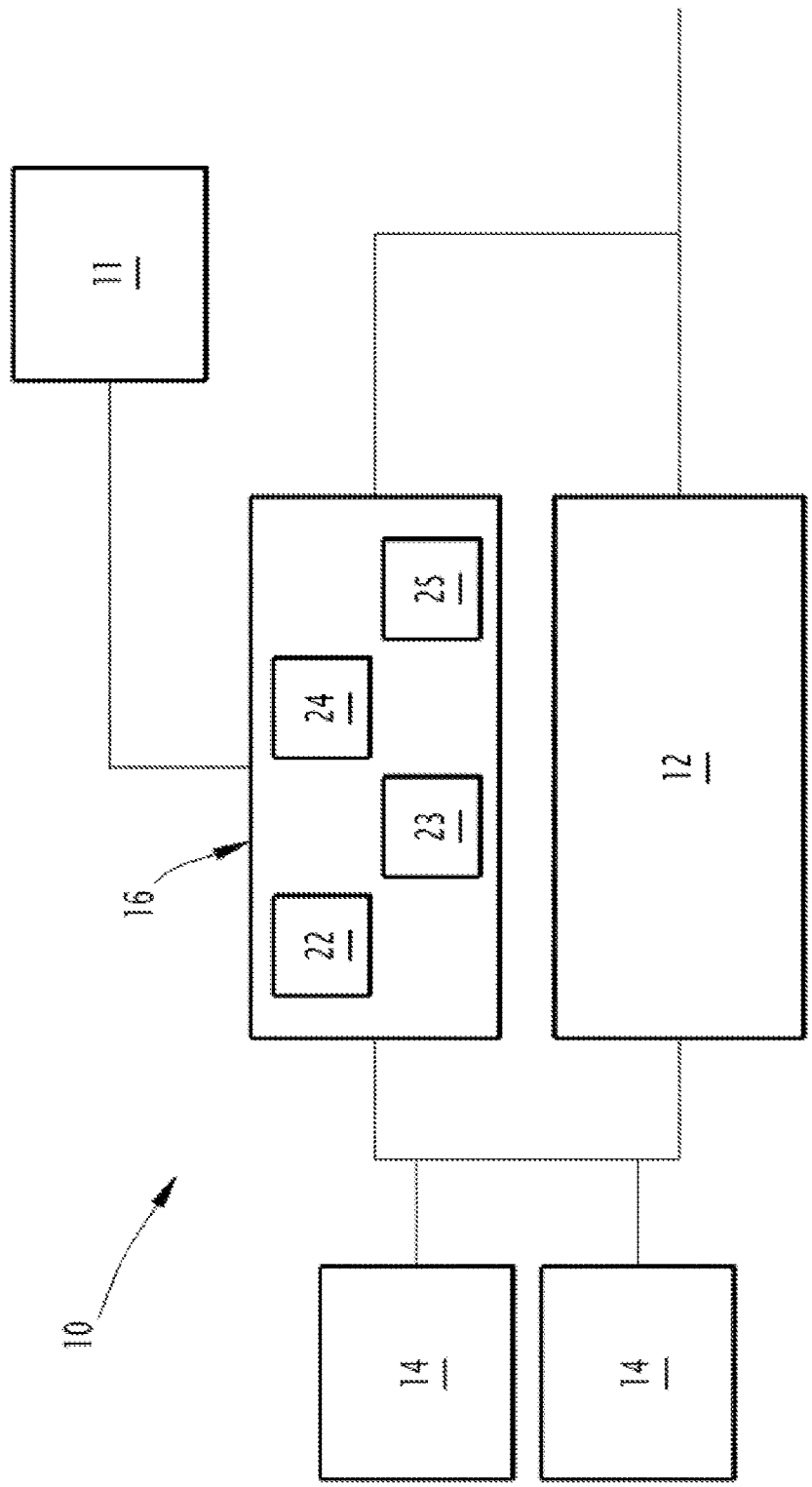
FIG. 3 is a schematic view of a carrier geolocation system according to the invention, the geolocation system comprising in particular a detection device according to the invention and two antennas in the example of said figure.

The geolocation system 10 shown in FIG. 3 is used for geolocating a carrier wherein the system is on-board.

The carrier is e.g. an aircraft, such as a drone, moving in space in three dimensions, or a land or a sea vehicle moving in a plane in two dimensions or e.g. a railway vehicle moving along only one direction along a railway track.

The carrier comprises in particular an inertial measurement device 11.

The inertial measurement module 11 supplies values describing the attitude of the carrier.

More particularly, the inertial measurement module 11 supplies the geolocation system 10 with values describing the attitude of the carrier which comprise in particular the heading, the roll and the pitch of the latter.

The geolocation system 10 comprises a GNSS receiver 12, one or a plurality of antennas 14 and a multipath detection device 16.

The or each antenna 14 is known per se and in particular and is used for receiving GNSS signals from one or a plurality of global satellite positioning systems, such as e.g. the GPS, Galileo or GLONASS.

More particularly, as is known per se, the or each antenna 14 defines a phase center and a plane of arrival of the GNSS signals.

The position of the or each antenna 14 is known at any time in a coordinate frame of the carrier. More particularly, the above means that the positions of the plane of arrival and of the phase center of the or each antenna 14 are also known in the same coordinate frame.

The number of antennas 14 is chosen according to the embodiments described in detail thereafter.

More particularly, according to a first embodiment (not illustrated in the figures), only one antenna 14 is used. In the coordinate frame of the carrier, the antenna 14 can be either mobile or fixed. When the antenna 14 is mobile, same is e.g. mounted on an actuator provided for this purpose.

According to such example of embodiment, the term "apparent phase center" used hereinafter refers to the phase center of the antenna 14.

According to a second embodiment (illustrated in the figures), a plurality of antennas 14 are used. Each of the antennas 14 has e.g. a fixed antenna in the coordinate frame of the carrier.

According to such example of embodiment, the term "apparent phase center" refers to the phase center of the antenna 14 active at a given instant or when a plurality of antennas are active at the same instant and the signals coming from the antennas are superimposed, the phase center obtained after the superposition of the phase centers of the active antennas 14.

In the example shown in FIG. 3, two antennas 14 are illustrated.

Figure 4:
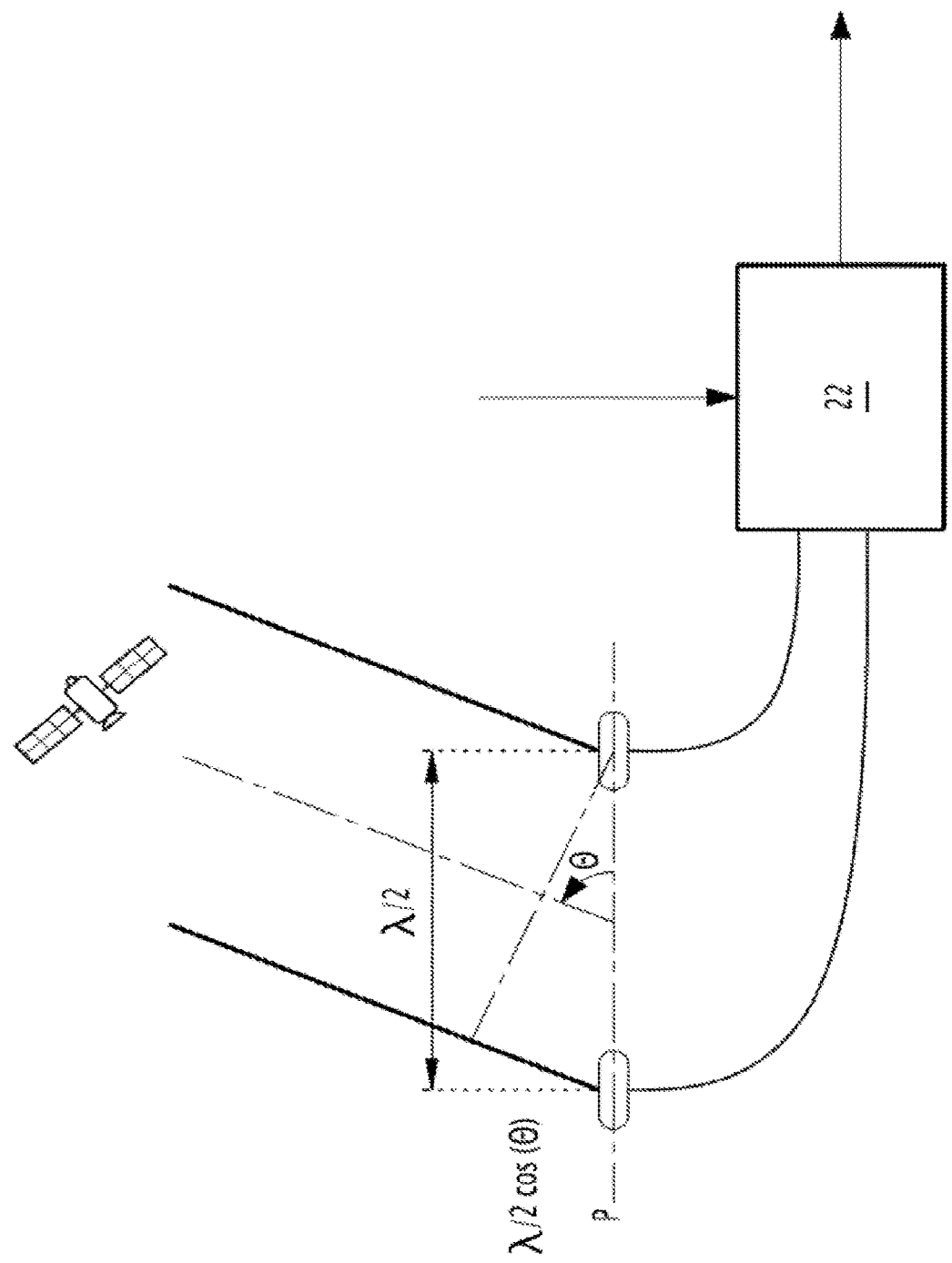
FIG. 4 is a schematic view of the placing of the antennas shown in FIG. 3.

The respective positions of the antennas 14 are shown in more detail in FIG. 4.

More particularly, in the example shown in FIG. 4, the antennas 14 are placed in the same plane P so that the planes of arrival of the antennas coincide.

Furthermore, the antennas 14 are separated from each other by half the wavelength of the GNSS signals.

The above means that the antennas 14 are separated from each other by a few centimeters to about ten centimeters.

It is possible to move the antennas 14 away from each other along another distance. Preferentially, such a distance is less than one wavelength of the GNSS signals.

The knowledge of such distance is used for determining the phase shift of the GNSS signals received by the antennas 14.

The GNSS receiver 12 is known per se.

More particularly, as can be seen in FIG. 3, the receiver 12 is connected to the antennas 14, so as to receive GNSS signals received by the antennas 14.

In a manner known per se, from the received signals, the GNSS receiver 12 determines a navigation solution and, in particular, the position of the carrier in a terrestrial coordinate frame.

The position is determined in a manner known per se, in particular by applying a filtering of the signals received from the antennas 14, by making correlations and other types of processing of the signals.

The GNSS receiver 12 is further apt to supply an observable value.

According to an example of embodiment, the observable value is a measurement of phase or of a pseudo-velocity of a given satellite.

According to another embodiment, the observable value is a measurement of the velocity resolved from the pseudo-velocities.

The resolved velocity is thereby the velocity of the carrier determined in a terrestrial coordinate frame.

The detection device 16 is used for determining multipaths of the GNSS signals received by the antennas 14 by analyzing in particular the observable value coming from the GNSS receiver 12.

When multipaths are detected, the detection device 16 is used e.g. for emitting an alert which is e.g. intended for a control system for the position of the carrier.

Upon reception of such an alert, the position control system is used e.g. for alerting a pilot (or user) of the carrier or for deactivating at least temporarily the calculation of the position, performed by the GNSS receiver 12.

With reference to FIG. 3, the detection device 16 comprises a movement generation module 22, a control module 23, a prediction module 24 and an anomaly detection module 25.

Each of the modules 22 to 25 is e.g. in the form of software implemented by a suitable computer and/or at least partially in the hardware form, e.g. in the form of a FPGA (standing for "Field-Programmable Gate Array") programmable logic circuit.

The movement generation module 22 is used for generating a movement of the apparent phase center of the antenna or antennas 14 according to a predetermined control law.

According to the first embodiment, i.e. when the system 10 comprises only one antenna 14, the movement generated by the module 22 is mechanical.

In other words, in such case, the movement generation module 22 is used for controlling either the mechanical actuator on which the antenna 14 is mounted when the antenna is mobile or at least one actuator of the carrier as such, for moving the carrier when the antenna is fixed. In a variant, when the antenna is mobile, the movement generation module 22 is used for simultaneously controlling the actuator of the antenna and at least one actuator of the carrier.

According to the second example of embodiment, i.e. when the system 10 comprises at least two antennas 14, the movement generation module 22 is apt to generate a movement of the apparent phase center of the antennas 14 in an electrical way.

In other words, in such case, the physical positions of the antennas 14 are not modified but the transmission of the GNSS signals received by the antennas is switched according to the control law.

In such case, the movement generation module 22 is then in the form of a switch the switching of which is controlled according to the control law.

The control module 23 can be used for determining the control law. Such law is determined according to the desired movement of the apparent phase center of the antenna or antennas 14.

Preferentially, the movement is non-orthogonal to the multipaths and chosen along the direction or directions wherein the occurrence and/or the consequences of the multipaths are the most important.

More particularly, when the carrier moves along an axis (such as a train), the movement of the apparent phase center should also take place along the same axis (a multipath error on the vertical axis or the transverse axis not being feared events).

When the carrier moves along two axes, e.g. in a horizontal plane (such as e.g. a car), the movement of the apparent phase center should also take place in a horizontal plane.

Finally, when the carrier moves through the whole space (such as an aircraft), the movement of the apparent phase center should also take place along all directions.

Furthermore, the control law is chosen according to the nature of the movement generated by the movement generation module 22.

E.g., in the case of an electrical movement, the control law has e.g. a pseudo-random signal with a frequency of about 1 Hz which is sufficiently rapid as to guarantee an alert time of a few seconds and is slow enough to generate a transient of the observable value.

The prediction module 24 is configured for determining, at each instant, a prediction of the observable value supplied by the GNSS receiver 12 at the same instant.

Such predictions are calculated using a transfer function reproducing the operation of the GNSS receiver 12.

More particularly, the prediction module is apt to determine said predictions from the control law determined by the control module 23 and from the directions of arrival of the direct paths of the GNSS signals with respect to the plane of arrival of each antenna.

The directions of arrival of the direct paths of the GNSS signals with respect to the planes of arrival of the antennas 14 are determined in particular by using the values describing the attitude of the carrier and the absolute directions of arrival of the direct paths. Such directions of arrival of the direct paths are visible in FIG. 4 wherein same form the angle θ with the plane of arrival of the antennas 14.

The values describing the attitude of the carrier are coming from the inertial measurement module 11.

The absolute directions of arrival of the direct paths are determined by knowing an approximate position of the carrier in the terrestrial coordinate frame and by analyzing the almanacs and the ephemerids of the corresponding satellites of the GNSS system in said position.

It is in this way possible to determine the projection of the directions of arrival of the direct paths in the coordinate frame of the carrier.

Furthermore, when the movement of the apparent phase center is reached by switching the signals coming from a plurality of antennas 14 or by mechanical movement of the antennas, the phase shift of the signals related to the arrangement of the antennas and the differences in the transmission time of the signals to the GNSS receiver 12 can be taken into account.

The anomaly detection module 25 is used for detecting multipaths by analyzing, at each instant, the observable value coming from the GNSS receiver 12 and the corresponding prediction which is calculated by the prediction module 24.

More particularly, the anomaly detection module 25 is configured for analyzing a residue obtained after subtraction of the prediction obtained by the prediction module 24 from the corresponding observable value coming from the GNSS receiver 12.

In other words, the residue obtained by the anomaly detection module 25 has the observable value which is free of any transient generated by the movement generation module 22.

Thereby, the anomaly detection module 25 is used for detecting an anomaly by analyzing the residue and in particular by comparing the residue with a predetermined threshold.

To this end, the anomaly detection module 25 can compare the residue e.g. with the control law generated by the module 23.

Figure 5:
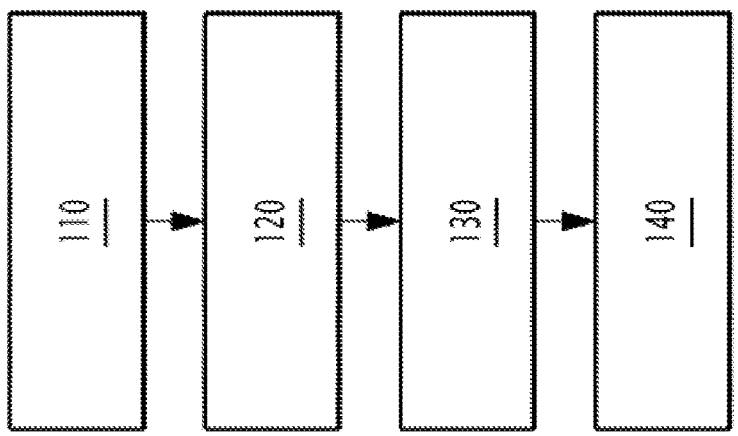
FIG. 5 is an organization chart of a detection method used by the detection device shown in FIG. 3.
Figure 6:
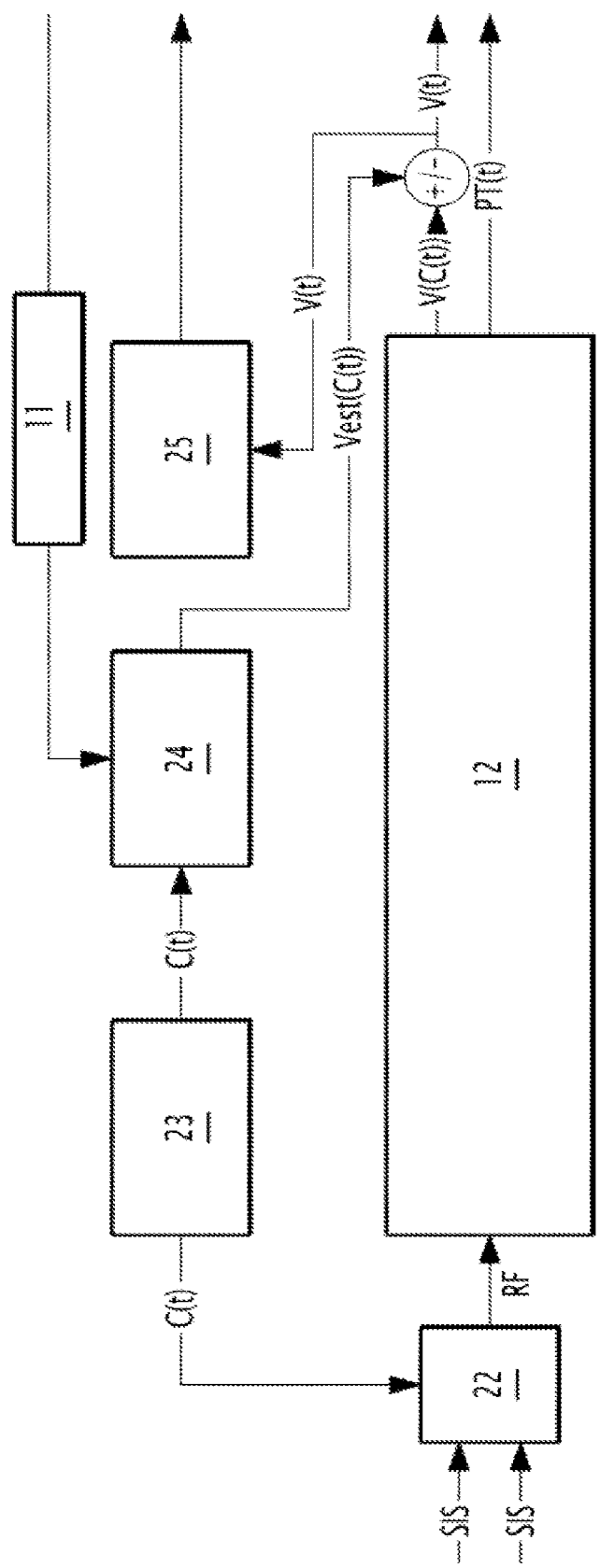
FIG. 6 is a schematic view explaining the functioning of the detection device shown in FIG. 3.

The detection method implemented by the detection device 16 according to the invention will now be explained with reference to FIG. 5 which shows an organization chart of the method and to FIG. 6 which explains the functioning of the device 16.

During an initial step 110, the control module 23 determines a control law C(t).

As explained hereinabove, the control law C(t) is determined according to the desired movement of the apparent phase center and to the nature of the movement generation module 22.

The step 110 is e.g. implemented prior to the use of the geolocation system 10 in the carrier.

The following steps are implemented when the GNSS receiver 12 is in operation and determines the observable value V and the position of the carrier PT.

More particularly, during the step 120, the movement generation module 22 sets the apparent phase center in motion according to the control law C(t) determined by the control module 23.

The above modifies the observable value V determined by the receiver 12 which then becomes dependent on the control law C(t). In other words, V=V(C(t)).

During the next step 130, the prediction module 24 determines, at each instant, the prediction $V_{est}(C(t))$ of the observable value supplied by the GNSS receiver 12 at the same instant.

As indicated hereinabove, the prediction $V_{est}(C(t))$ is determined by the prediction module 24 from the directions of arrival of the direct paths of the GNSS signals with respect to the plane(s) of arrival of the antenna(s) 14.

During the next step 140, the anomaly detection module 25 analyzes the observable value V(C(t)) supplied by the GNSS receiver 12 and the corresponding prediction $V_{est}(C(t))$ supplied by the prediction module 24.

To this end, as explained above, the detection module 25 subtracts e.g. from the observable value V(C(t)) supplied by the GNSS receiver 12, the prediction $V_{est}(C(t))$ calculated by the module 24.

The anomaly detection module 25 then analyzes the residue V(t) obtained following the subtraction and compares the residue with a predetermined threshold.

When the residue exceeds said threshold, the anomaly detection module 25 then emits an alert which is, as explained above, intended for the operator or for any other control system of the carrier.

In this way, it can be understood that the present invention has a certain number of advantages.

First of all, it is clear that the invention can be used for detecting multipaths using only observable values coming from a GNSS receiver.

Thereby, the invention can be used with any receiver which can provide such an observable value without any intervention in the processing performed inside the GNSS receiver.

Moreover, compared with the prior art methods of the first type, the detection device according to the invention has a simple structure and can be used for efficiency detecting multipaths.

The invention claimed is:

1. A GNSS signal multipath detection device for a GNSS receiver on-board a carrier, the carrier further comprising one or a plurality of antennas defining an apparent phase center and at least one plane of arrival of the GNSS signals, the or each antenna being apt to receive GNSS signals propagating along either direct or indirect paths and to transmit same to the GNSS receiver, the GNSS receiver being apt to supply an observable value determined from the signals received by the or each antenna;
the detection device comprising:
a movement generation module configured for generating a motion of the apparent phase center according to a predetermined control law;
a control module configured for determining the control law;
a prediction module configured for determining, at each instant, a prediction of the observable value provided by the GNSS receiver at the same instant, from the control law and directions of arrival of the direct paths of the GNSS signals with respect to the or each plane of arrival;
an anomaly detection module configured for detecting multipaths of GNSS signals received by the GNSS receiver, by comparing the observable value from the GNSS receiver with the corresponding prediction thereof.

2. A detection device according to claim 1, wherein, when the carrier comprises at least two antennas, the movement generation module being a switch apt to switch the transmission to the GNSS receiver of the signals received by the antennas, so as to generate an electrical movement of the apparent phase center according to the control law.

3. The detection device according to claim 1, wherein the movement generation module is apt to control at least one mechanical actuator of the carrier and/or of the or each antenna, so as to generate a mechanical movement of the apparent phase center according to the control law.

4. The detection device according to claim 1, wherein the directions of arrival of the direct paths of the GNSS signals with respect to the or each plane of arrival are determined from the absolute directions of arrival of the paths and from values describing the attitude of the carrier.

5. The detection device according to claim 4, wherein the values describing the attitude of the carrier include the heading, roll and pitch of the carrier.

6. The detection device according to claim 1, wherein the anomaly detection module is configured for analyzing a residue obtained after subtracting the prediction obtained by the prediction module from the corresponding observable value, so as to detect multipaths of the GNSS signals.

7. The detection device according to claim 6, wherein the anomaly detection module is configured for comparing said residue with the control law.

8. The detection device according to claim 1, wherein the observable value is a measurement of phase or of pseudo-velocity of a given satellite or a measurement of the resolved velocity of the carrier.

9. The detection device according to claim 1, wherein the control law is determined according to a motion not orthogonal to the multipaths, the motion being chosen along the direction or directions wherein the occurrence and/or consequences of the multipaths are most important.

10. A geolocation system for a carrier, comprising:
a GNSS receiver apt to provide an observable value;
one or a plurality of antennas defining an apparent phase center and at least one plane of arrival, the or each antenna being able to receive GNSS signals propagating along direct or indirect paths and to transmit them to the receiver to provide the observable value;
a detection device for multipaths of GNSS signals, according to claim 1.

11. A method for detecting multi-paths of GNSS signals for a GNSS receiver on-board a carrier, the carrier further comprising one or a plurality of antennas defining an apparent phase center and at least one plane of arrival, the or each antenna being apt to receive GNSS signals propagating along either direct or indirect paths and to transmit same to the receiver, the GNSS receiver being apt to supply an observable value determined from the signals received by the or each antenna;
the detection method comprising the following steps:
determination of a control law;
setting in motion the apparent phase center according to the control law;
determination, at each instant, of a prediction of the observable value provided by the GNSS receiver at the same instant, from the control law and directions of arrival of the direct paths of the GNSS signals with respect to the or each plane of arrival;
detection of the multipaths of the GNSS signals received by the GNSS receiver, by comparison of the observable value coming from the GNSS receiver with the corresponding prediction thereof.

* * * * *